July 1, 1969        H. WARP        3,452,497
PLASTIC MAT WITH REINFORCED END
Filed July 19, 1967
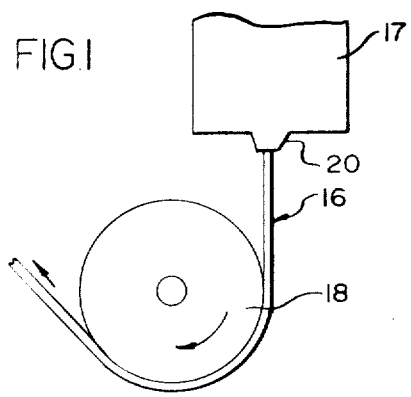
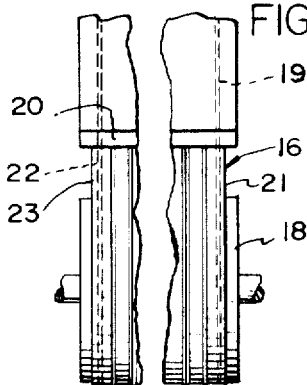
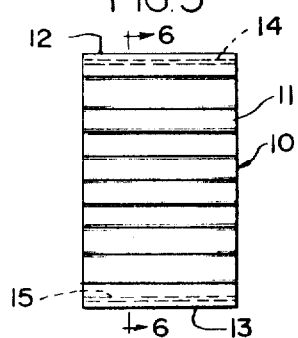
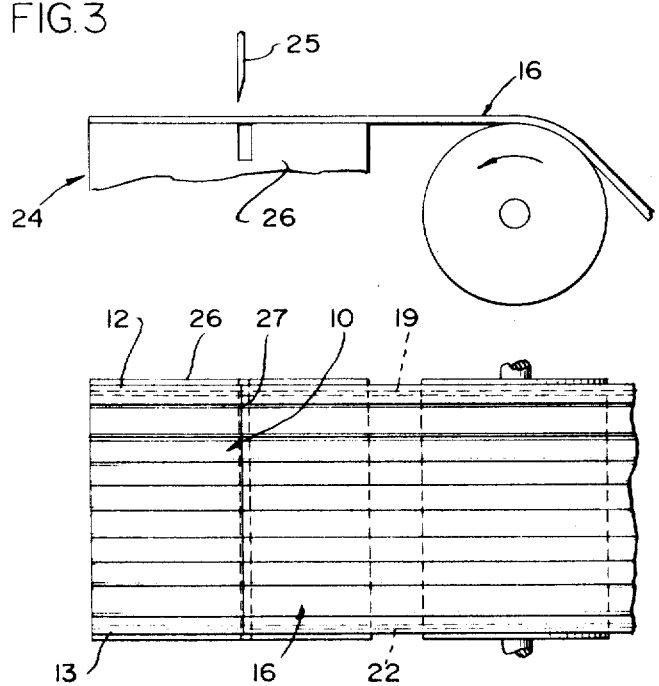
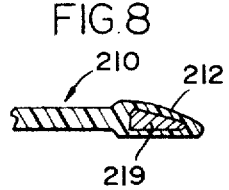
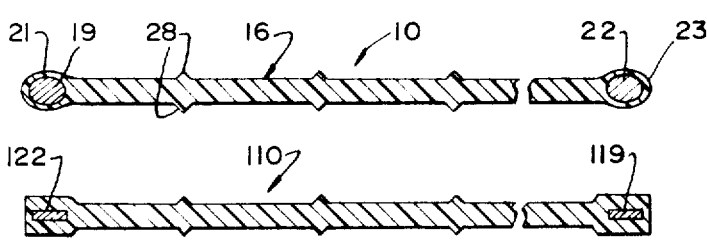
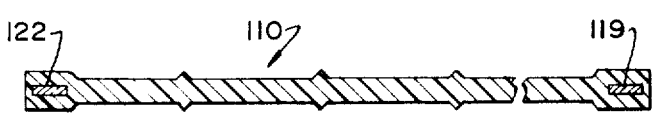
INVENTOR.
HAROLD WARP

United States Patent Office 3,452,497
Patented July 1, 1969

3,452,497
PLASTIC MAT WITH REINFORCED END
Harold Warp, Chicago, Ill., assignor to Flex-O-Glass,
Inc., a corporation of Illinois
Filed July 19, 1967, Ser. No. 654,401
Int. Cl. A47g *27/02;* B32b *3/08;* B44d *5/08*
U.S. Cl. 52—177                                              7 Claims

ABSTRACT OF THE DISCLOSURE

A plastic mat having a reinforcing element in the ends thereof for reinforcing the ends and causing them to lie flat on a subjacent floor surface. The reinforcing elements are installed in the plastic end portions by forming a plastic sheet having a width equal to the length of the desired mat structure, providing in the sheet as it is extruded the reinforcing elements along the opposite edges of the sheet, and cutting the sheet across the width thereof at portions spaced apart the width of the intended mat structure, whereby the reinforcing elements define a reinforcement of the opposite ends of the resultant mat structure.

---

This invention relates to mat structures and in particular to plastic mat structures having reinforcing means in the ends thereof.

One form of plastic mat structure comprises a runner which is intended to be laid upon carpeting and the like during inclement weather to protect the carpeting. When the runner is not in use, the user conventionally rolls the runner into a compact cylinder for facilitated storage. Such rolling causes the plastic runner to have a curvature tending to cause the opposite ends of the runner to turn up when the runner is again installed on the carpeting. The upturning of the runner ends causes the ends to be engaged by the shoes of people walking thereover with resulting tearing and similar damage. One attempted solution to this vexatious problem has been to provide a metal binder on the ends. This solution has not proven completely satisfactory because of the substantial cost involved in applying the binder and, further, because of the sharpness of the cut ends of the metal binder which may cause undesirable damage.

The present invention comprehends an improved plastic mat srtucture eliminating the disadvantages of the above discussed mat structures in a novel and simple manner.

Thus, a principal object of the precent invention is the provision of a new and improved plastic mat structure.

Another object of the invention is the provision of such a mat structure which is extremely simple and economical of construction while yet eliminating the undesirable upturned end conditions of the known plastic mat structures.

A further object of the invention is the provision of such a mat structure wherein reinforcing means are embedded in the ends of the mat structure by firstly arranging the sheet from which the mat structure is made so as to have the reinforcing elements disposed in the side edges thereof, with subsequent cutting of the sheet to cause the side edges thereof to become the end portions of the resultant mat structure.

Still another object of the invention is the provision of such a mat structure comprising a length of plastic material having end reinforcing means, formed by extruding a plastic to form a sheet having a width equal to the length of the mat structure, providing in the sheet as it is extruded a reinforcement element extending adjacent one edge of the sheet, and cutting the sheet across the width thereof at portions spaced apart the width of the mat structure whereby the metal reinforcement defines a reinforcement of one end of the resultant mat structure.

Yet another object of the invention is the provision of such a mat structure wherein the reinforcing element is relatively heavy to cause the end portion of the mat structure to lie flat on a subjacent supporting surface.

A further object of the invention is the provision of such a mat structure wherein the metal reinforcing element is delivered into the edge portion of the sheet as it is extruded thereby to facilitate the provision of the reinforcement in the subsequent end portion of the mta structure.

Another object of the invention is the provision of a new and improved method of forming such a mat structure.

Other features and advantages of the invention will be apparent from the following description taken in connection with the accompanying drawing wherein:

FIGURE 1 is a schematic side elevation of an apparatus for forming a plastic sheet to be used in subsequently forming a mat structure embodying the invention;

FIGURE 2 is a broken side elevation thereof;

FIGURE 3 is a schematic side elevation illustrating a subsequent step in the forming of a mat structure from the extruded plastic sheet;

FIGURE 4 is a top plan view thereof;

FIGURE 5 is a top plan view of a resultant mat structure embodying the invention;

FIGURE 6 is a fragmentary enlarged transverse section thereof taken substantially along the line 6—6 of FIGURE 5;

FIGURE 7 is a fragmentary enlarged section of a modified form of mat structure embodying the invention; and FIGURE 8 is a fragmentary enlarged section of a further modified form of mat structure embodying the invention.

In the exemplary embodiment of the invention as disclosed in the drawing, a mat structure generally designated 10 is shown to comprise a rectangular plastic sheet 11 having opposite end portions 12 and 13 respectively provided with reinforcing elements 14 and 15. In the illustrated embodiment, the plastic mat structure comprises a rectangular runner having a width of approximately 2½ feet and a length of approximately 5 feet.

The mat structure 10 is formed herein by firstly extruding a plastic sheet 16 by means of a conventional extruder 17. The sheet may be set by a conventional setting roller 18. As shown in FIGURE 2, a reinforcing wire 19 may be delivered into the extruded sheet 16 through the lip 20 of the extruder 17 along one edge 21 of the sheet, and a similar reinforcing wire 22 may be delivered into the opposite edge 23 of the sheet 16 through the lip 20.

Upon completion of the setting of the plastic sheet 16, the sheet may be delivered to a suitable cutting apparatus generally designated 24, having a cutting blade 25, as shown in FIGURE 3, for cutting the sheet as it moves over a suitable cutting table 26. As shown in FIGURE 4, the sheet is cut along a line 27 extending transversely, completely across the sheet to sever an end portion thereof effectively defining the mat structure 10. Thus, whereas the reinforcing wires 19 and 22 are in the edge portions of the sheet 16 as shown in FIGURE 4, they become reinforcing wires in the ends 12 and 13 of the cut portion defining the mat structure 10.

Referring now more specifically to FIGURE 6, the transverse section of the mat structure shows the embedding of the reinforcing wires 19 and 22 in an enlarged edge portion 21 and 23, respectively, of the sheet 16 for improved retention of the reinforcing means therein. As shown in FIGURE 6, the sheet may be provided with transverse ribs 28 for providing an antiskid means in the mat structure 10, as desired.

In FIGURE 7, a modified form of mat structure generally designated 110 is shown to comprise a mat structure generally similar to mat structure 10, but having flat reinforcing strips 119 and 122 in lieu of the wires 19 and 22 of mat structure 10. The sheet may be set by a conventional setting roller 18. As shown in FIGURE 2, a reinforcing wire 19 may be delivered into the extruded sheet 16 through the lip 20 of the extruder 17 along one edge 21 of the sheet, and a similar reinforcing wire 22 may be delivered into the opposite edge 23 of the sheet 16 through the lip 20.

Upon completion of the setting of the plastic sheet 16, the sheet may be delivered to a suitable cutting apparatus generally designated 24, having a cutting blade 25, as shown in FIGURE 3, for cutting the sheet as it moves over a suitable cutting table 26. As shown in FIGURE 4, the sheet is cut along a line 27 extending transversely, completely across the sheet to sever an end portion thereof effectively defining the mat structure 10. Thus, whereas the reinforcing wires 19 and 22 are in the edge portions of the sheet 16 as shown in FIGURE 4, they become reinforcing wires in the ends 12 and 13 of the cut portion defining the mat structure 10.

Referring now more specifically to FIGURE 6, the transverse section of the mat structure shows the embedding of the reinforcing wires 19 and 22 in an enlarged edge portion 21 and 23, respectively, of the sheet 16 for improved retention of the reinforcing means therein. As shown in FIGURE 6, the sheet may be provided with transverse ribs 28 for providing an antiskid means in the mat structure 10, as desired.

In FIGURE 7, a modified form of mat structure generally designated 110 is shown to comprise a mat structure generally similar to mat structure 10, but having flat reinforcing strips 119 and 122 in lieu of the wires 19 and 22 of mat structure 10.

In FIGURE 8, a further modified form of mat structure generally designated 210 is shown to comprise a mat structure generally similar to mat structure 10, but having a tapered end portion 212 and a correspondingly tapered reinforcement element 219 permitting the distal edge of the mat end to taper into the bottom surface thereof for improved resistance to lifting as by a user's shoe engaging the end portion.

As indicated above, the mat structure 10 comprises a plastic mat formed by extruding a suitable plastic to form a sheet having a width equal to the length of the mat structure 10, providing in this sheet as it is extruded a reinforcement element in each of the opposite edge portions thereof, and cutting the sheet transversely across the width thereof at portions spaced apart the width of the desired mat structure, whereby the reinforcement means define reinforcement means at the opposite ends of the resultant mat structure 10. The reinforcement means herein may be formed of any suitable relatively heavy material, such as metal, and may be formed of a dead soft metal as desired. Preferably, the weight of the reinforcing elements is sufficient to cause the plastic mat ends to lie flat on the subjacent floor surface.

Thus, the mat structure of the present invention comprises an improved economical structure. A number of different reinforcement elements are illustratively disclosed, it being understood that other suitable configurations may be employed within the scope of the invention. Further, by constructing the mat as disclosed, any slight tendency for the mat to curl as a result of the forming thereof about the setting roller such as roller 18 is eliminated as such mat curvature is parallel to the longitudinal extent of the mat and, thus, not in a direction tending to cause lifting of the opposite ends of the mat from the subjacent floor.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A floor mat structure having a long dimension and a short dimension comprising a sheet extrusion of plastic material having its long dimension perpendicular to the extrusion direction of the plastic, and a relatively heavy element integrally embedded in said sheet extrusion extending adjacent one extruded edge of the sheet defining the short dimension of the sheet extrusion and mat structure, said mat structure being defined along the long dimension sides thereof by cut edges extending perpendicular to the extrusion direction of the plastic, said element defining reinforcing means maintaining said short dimension edge of the floor mat structure flat on a subjacent floor, said mat structure further having antislip means defining the upper surface thereof.

2. The floor structure of claim 1 wherein said element comprises a metal wire.

3. The floor mat structure of claim 1 wherein said element is formed of a dead soft metal.

4. The floor mat structure of claim 1 wherein said element is formed of a flat metal strip.

5. The mat structure of claim 1 wherein said mat structure is formed to have a length of approximately five feet and a width of approximately two and one-half feet.

6. The floor mat structure of claim 1 wherein said element is formed of a metal having a density greater than that of said plastic material.

7. The floor mat structure of claim 1 wherein said element has a weight preselected to cause said end to lie flat on a subjacent supporting surface.

References Cited
UNITED STATES PATENTS

| | | | |
|---|---|---|---|
| 1,914,520 | 6/1933 | McIlroy | 161—86 X |
| 2,184,970 | 12/1939 | Allen | 161—118 |
| 2,513,886 | 7/1950 | Mix | 161—118 X |
| 3,074,832 | 1/1963 | Graff | 161—44 |
| 3,111,569 | 11/1963 | Rubenstein. | |
| 3,288,895 | 11/1966 | Windeler | 264—174 X |
| 2,545,981 | 3/1951 | Warp | 161—123 |

JOHN E. MURTAGH, *Primary Examiner.*

U.S. Cl. X.R.

16—1; 52—309; 161—86, 123